(12) United States Patent
Stubblefield, Jr. et al.

(10) Patent No.: US 10,161,549 B2
(45) Date of Patent: Dec. 25, 2018

(54) ALKY-ONE GASKET

(71) Applicants: Alan Stubblefield, Jr., Placentia, CA (US); David Walter Reeves, Orinda, CA (US)

(72) Inventors: Alan Stubblefield, Jr., Placentia, CA (US); David Walter Reeves, Orinda, CA (US)

(73) Assignee: Eriks N.V (NL)

( * ) Notice: Subject to any disclaimer, the term of this patent is extended or adjusted under 35 U.S.C. 154(b) by 0 days.

(21) Appl. No.: 15/204,521

(22) Filed: Jul. 7, 2016

(65) Prior Publication Data

US 2016/0319971 A1    Nov. 3, 2016

Related U.S. Application Data

(60) Division of application No. 13/966,159, filed on Aug. 13, 2013, now Pat. No. 9,388,924, which is a continuation-in-part of application No. 13/051,188, filed on Mar. 18, 2011.

(51) Int. Cl.
| | |
|---|---|
| *F16J 15/12* | (2006.01) |
| *F16L 23/18* | (2006.01) |
| *F16L 19/025* | (2006.01) |
| *F16J 15/06* | (2006.01) |

(52) U.S. Cl.
CPC ............ *F16L 23/18* (2013.01); *F16J 15/061* (2013.01); *F16J 15/122* (2013.01); *F16J 15/127* (2013.01); *F16L 19/025* (2013.01); *Y10T 29/49297* (2015.01); *Y10T 29/49298* (2015.01)

(58) Field of Classification Search
CPC ........ F16L 19/025; F16L 23/18; F16J 15/061; F16J 15/127; F16J 15/122; Y10T 29/49298; Y10T 29/49297
See application file for complete search history.

(56) References Cited

U.S. PATENT DOCUMENTS

| | | | |
|---|---|---|---|
| 6,367,803 B1 * | 4/2002 | Loth | F16L 23/18 277/321 |
| 7,455,301 B2 * | 11/2008 | Ragsdale | F16J 15/122 277/627 |
| 9,551,422 B2 * | 1/2017 | Bond | F16J 15/064 |

\* cited by examiner

*Primary Examiner* — Sarang Afzali
*Assistant Examiner* — Ruth G Hidalgo-Hernandez
(74) *Attorney, Agent, or Firm* — Cohen & Grigsby, P.C.

(57) ABSTRACT

A method is provided for forming a gasket for sealing opposing flange surfaces of a pipe having corrosive fluid flowing therethrough. The method comprises defining a gasket profile incorporating a serrated profile core having a flange extending radially inward therefrom. A deformable pillow extends radially inward from the serrated profile core, to define a gasket intermediate portion about the flange, and a gasket inner portion radially inward from the flange. The deformable pillow material and thickness are selected such that upon compression to a thickness no less than the core thickness, the gasket inner portion exhibits a stress level sufficient to preclude corrosive liquid flowing through the pipe from passing radially outward beyond the gasket inner portion, and the gasket intermediate portion exhibits a stress level sufficient to preclude gas and liquid flowing through the pipe from passing radially outward beyond the gasket intermediate portion.

16 Claims, 8 Drawing Sheets

ALKY - ONE Bolt Load and Seating Stress Distribution - 150# Series

| 150# Size | Total Stud Load (lbs) | Load (lbs) | | | Percentage of Total Load | | | Seating Stress (psi) | | |
|---|---|---|---|---|---|---|---|---|---|---|
| | | Zone A | Zone B | Zone C | Zone A | Zone B | Zone C | Zone A | Zone B | Zone C |
| 1/2" | 19,144 | 143 | 699 | 18,302 | 1% | 4% | 96% | 680 | 3600 | 20713 |
| 3/4" | 25,452 | 214 | 987 | 24,251 | 1% | 4% | 95% | 680 | 3600 | 21480 |
| 1" | 31,747 | 407 | 1,016 | 30,324 | 1% | 3% | 96% | 680 | 3600 | 22063 |
| 1-1/2" | 37,714 | 776 | 3,181 | 33,758 | 2% | 8% | 90% | 680 | 3600 | 16374 |
| 2" | 65,489 | 1,483 | 6,229 | 57,776 | 2% | 10% | 88% | 680 | 3600 | 21797 |
| 2-1/2" | 65,018 | 1,961 | 7,289 | 55,767 | 3% | 11% | 86% | 680 | 3600 | 18324 |
| 3" | 64,286 | 3,639 | 9,262 | 51,385 | 6% | 14% | 80% | 680 | 3600 | 13774 |
| 4" | 118,955 | 5,708 | 11,663 | 101,584 | 5% | 10% | 85% | 680 | 3600 | 21784 |
| 5" | 164,643 | 6,910 | 13,784 | 143,950 | 4% | 8% | 87% | 680 | 3600 | 20947 |
| 6" | 179,164 | 9,594 | 16,302 | 153,267 | 5% | 9% | 86% | 680 | 3600 | 19068 |
| 8" | 171,561 | 12,183 | 21,360 | 138,018 | 7% | 12% | 80% | 680 | 3600 | 17105 |
| 10" | 359,027 | 12,590 | 25,049 | 321,388 | 4% | 7% | 90% | 680 | 3600 | 22045 |
| 12" | 349,025 | 17,524 | 49,701 | 281,800 | 5% | 14% | 81% | 680 | 3600 | 19543 |
| 14" | 466,481 | 11,316 | 84,823 | 370,342 | 2% | 18% | 79% | 680 | 3600 | 19802 |
| 16" | 558,874 | 17,357 | 97,546 | 443,970 | 3% | 17% | 79% | 680 | 3600 | 20792 |
| 18" | 783,306 | 25,717 | 110,270 | 647,319 | 3% | 14% | 83% | 680 | 3600 | 20102 |
| 20" | 979,907 | 25,725 | 120,873 | 833,310 | 3% | 12% | 85% | 680 | 3600 | 21016 |
| 24" | 1,320,141 | 32,545 | 144,199 | 1,143,397 | 2% | 11% | 87% | 680 | 3600 | 21871 |

FIG. 9

ALKY - ONE Bolt Load and Seating Stress Distribution - 300# Series

| 300# Size | Total Stud Load (lbs) | Load (lbs) | | | Percentage of Total Load | | | Seating Stress (psi) | | |
|---|---|---|---|---|---|---|---|---|---|---|
| | | Zone A | Zone B | Zone C | Zone A | Zone B | Zone C | Zone A | Zone B | Zone C |
| 1/2" | 19016 | 108 | 699 | 18209 | 1% | 4% | 96% | 680 | 3600 | 20609 |
| 3/4" | 25216 | 214 | 987 | 24015 | 1% | 4% | 95% | 680 | 3600 | 21271 |
| 1" | 35184 | 356 | 1285 | 33543 | 1% | 4% | 95% | 680 | 3600 | 24405 |
| 1-1/2" | 53687 | 776 | 3181 | 49730 | 1% | 6% | 93% | 680 | 3600 | 24121 |
| 2" | 68899 | 1483 | 6229 | 61186 | 2% | 9% | 89% | 680 | 3600 | 23083 |
| 2-1/2" | 81329 | 1961 | 7289 | 72078 | 2% | 9% | 89% | 680 | 3600 | 23683 |
| 3" | 113562 | 3119 | 8880 | 101563 | 3% | 8% | 89% | 680 | 3600 | 22070 |
| 4" | 177542 | 3987 | 11000 | 162555 | 2% | 6% | 92% | 680 | 3600 | 22031 |
| 5" | 172093 | 6893 | 13968 | 151233 | 4% | 8% | 88% | 680 | 3600 | 22091 |
| 6" | 233794 | 8641 | 15828 | 209280 | 4% | 7% | 90% | 680 | 3600 | 21864 |
| 8" | 320066 | 9613 | 20543 | 289909 | 3% | 6% | 91% | 680 | 3600 | 24008 |
| 10" | 472758 | 9519 | 24519 | 438720 | 2% | 5% | 93% | 680 | 3600 | 22800 |
| 12" | 625988 | 5082 | 75634 | 545272 | 1% | 12% | 87% | 680 | 3600 | 21372 |
| 14" | 601229 | 7477 | 83409 | 510343 | 1% | 14% | 85% | 680 | 3600 | 20628 |
| 16" | 764627 | 11818 | 95779 | 657030 | 2% | 13% | 86% | 680 | 3600 | 21909 |
| 18" | 1169855 | 15703 | 107442 | 1046709 | 1% | 9% | 89% | 680 | 3600 | 21938 |
| 20" | 1126410 | 22946 | 120166 | 983298 | 2% | 11% | 87% | 680 | 3600 | 22382 |
| 24" | 1348970 | 32545 | 144199 | 1172226 | 2% | 11% | 87% | 680 | 3600 | 22423 |

…
ALKY-ONE GASKET

CROSS-REFERENCE TO RELATED APPLICATIONS

This application is a divisional of application Ser. No. 13/966,159, filed Aug. 13, 2013, now U.S. Pat. No. 9,388,924, which is a continuation-in-part of application Ser. No. 13/051,188, filed Mar. 18, 2011, now abandoned, which are herein incorporated in their entirety by reference.

STATEMENT RE: FEDERALLY SPONSORED RESEARCH/DEVELOPMENT

Not Applicable

BACKGROUND

The present invention is directed to a method for designing a gasket for fluid sealing for severe acid environments, e.g. in alkalization plants.

Sealing gaskets have been used in a variety of different applications. The construction of such gaskets is typically the function of the application, the environment in which the gasket will be utilized, the stress load and other factors. Where gaskets are intended to be used in severely corrosive environments, the gasket construction will preferably also take into account the location of the seal(s), the need for a plurality of seals to isolate the primary seal from the corrosive environment, and the need to seal the imperfections on opposing surfaces of the pipe flanges, caused by erosion from the corrosive material following through the pipe. Such imperfections are most common near the inner radius of the pipe flanges, which is closest to the corrosive material flowing through the pipe. Consequently, it is preferable to locate the primary sealing element away from the inner radius of the gasket, where the adjacent surfaces of the flanges are less likely to bear such imperfections.

The particular gasket material is also a factor that is affected by application and environment factors. A softer, more readily conformable material can be useful to seal imperfections in the flange surfaces near the flange inner radius. However, such softer material may be less suitable to provide a proper seal (of sufficient stress load) to isolate the primary seal from the corrosive material flowing through the pipe.

Further, many sealing elements operate most effectively at relatively high stress levels, e.g. 20,000 to 30,000 psi or more. However, the greater the load bearing surface of the gasket, the more distributed the gasket stress, and the lower the stress per square inch.

Accordingly, to achieve the optimum gasket design, consideration must be given to not only the general gasket architecture, bolt load, desired gasket stress, and environmental factors, but must also consider the need for the different gasket components to function cooperatively in a specific application. As such, the size, material, and functional characteristics of the individual gasket elements must be carefully engineered for cooperative interaction. Because different portions of a multi-element gasket may have different load bearing stress characteristics, sealing characteristics and compressibility, the gasket design is preferably optimized for a load specific application, allowing each element to contribute to the functionality of the gasket, without degrading the contribution of other elements.

The present invention is directed gasket design processes, and a multi-zone gasket architecture, wherein each zone may be optimized for a specific function by a design process that which produces a gasket that, under a normal load, can produce a consistent gasket sealing stress of 20,000 psi or more on the primary sealing element, which is effectively sealed from the corrosive environment, while also being sufficiently soft to seal imperfection in the flange surfaces.

These and other features, objects and advantages of the invention are described below, in conjunction with the illustrated embodiments.

BRIEF SUMMARY

These and other features and advantages of the various embodiments disclosed herein will be better understood with respect to the following description and drawings, in which like numbers refer to like parts throughout.

A method is provided for forming a gasket for sealing opposing flange surfaces of a pipe having corrosive fluid flowing therethrough. The method comprises defining a gasket profile incorporating a serrated profile core, the core defining a core thickness. A flange is formed extending radially inward from the serrated profile core. A deformable pillow is formed extending radially inward from the serrate profile core, about the flange, to define a gasket intermediate portion. The deformable pillow further extends radially inward from the flange to define a gasket inner portion. The deformable pillow material and thickness are selected such that upon compression to a thickness no less than the core thickness, the gasket inner portion exhibits a stress level sufficient to preclude corrosive liquid flowing through the pipe from passing radially outward beyond the gasket inner portion, and the gasket intermediate portion exhibits a stress level sufficient to preclude gas and liquid flowing through the pipe from passing radially outward beyond the gasket intermediate portion.

The serrated profile sealing element may be defined as the primary gasket seal, i.e. the gasket portion bearing the highest portion stress level when a specified bolt load is applied to the gasket.

The characteristics of the intermediate portion may be varied by varying the flange thickness to provide a desired gasket intermediate portion stress level when the gasket intermediate portion is compressed to a thickness substantially corresponding to the core thickness. The gasket intermediate portion may function as a second primary seal, as it is preferably engineered to preclude the flow of liquid and gas from passing radially outward beyond the gasket intermediate seal.

The deformable pillow and pillow thickness may also be varied to provide a desired gasket inner portion stress level when the gasket inner portion is compressed to a thickness substantially corresponding to the core thickness.

The gasket core, which may be formed of fireproof or fire resistant material, upon application of a designated bolt load, results in a primary seal, which supports approximately 80% of the total gasket stress level.

The distribution of stress levels on the gasket inner seal, and the gasket intermediate seal may be varied by regulating the various parameters such as the deformable pillow, thickness and length, the flange thickness and length and the core thickness and length.

BRIEF DESCRIPTION OF THE DRAWINGS

These and other features and advantages of the various embodiments disclosed herein will be better understood with respect to the following description and drawings, in which like numbers refer to like parts throughout.

DETAILED DESCRIPTION

The description below is given by way of example, and not limitation. Given the disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

Figures 1, 2:
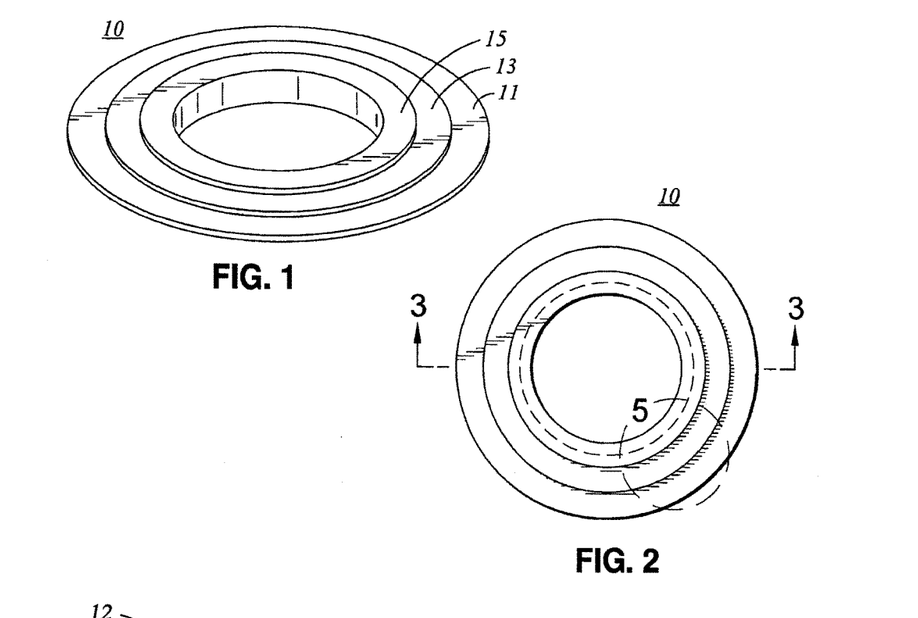
FIG. 1 is a front perspective view of a fluid sealing gasket in accordance with the present invention.
FIG. 2 is a top view of the gasket shown in FIG. 1.
Figure 3:
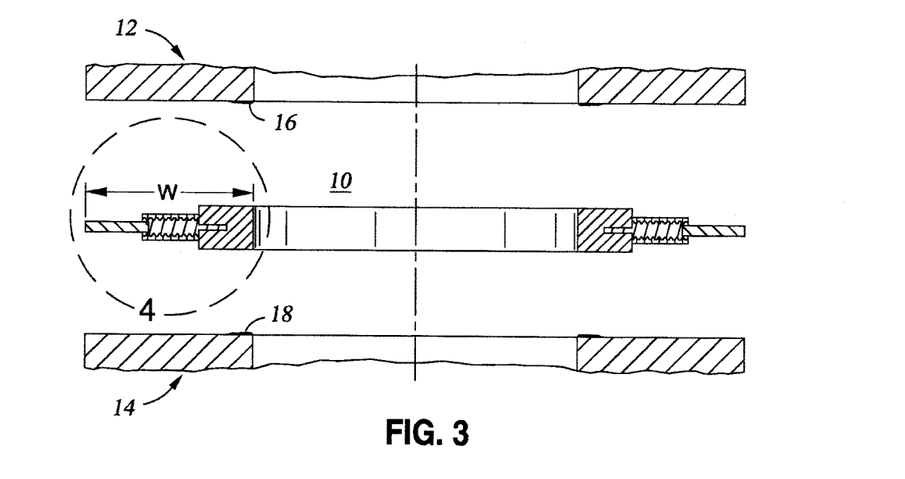
FIG. 3 is a sectional view of the gasket.

Referring to the drawings, the presently preferred embodiment of a fluid sealing gasket is illustrated therein. FIG. 1 illustrates the general architecture of a fluid sealing gasket 10, including an outer guide ring 11, a serrated profile sealing element 13, and a deformable inner barrier pillow 15. The inside surface of the deformable inner barrier pillow 15 defines an inner gasket surface 25. In use, the fluid sealing gasket 10 is disposed between a pair of opposing pipe flanges 12, 14, as shown in FIG. 3, and seals the connection between the flanges.

Serrated profile gaskets are used in many seals due to exceptional sealability and reliable performance. These profiles work by having a solid serrated body, or core 17, with a flexible covering layer or facing 21. The serrations minimize lateral movement of the facing material, while the metal alloy core provides rigidity and blowout resistance. The arrangement allows for a very high compression and an extremely tight seal along the ridges of the gasket.

The serrated profile gasket offers a safe, effective seal under the most exacting conditions on both standard pipe work and specialized applications. It offers excellent sealability and recovery characteristics, allowing seal integrity under pressure and temperature fluctuation, temperature differentials across the flange face, flange rotation, bolt stress relaxation and creep.

The serrations concentrate load on a smaller area for a tight seal at lower stress. Under compression the sealing material fills the surface imperfections to form a tight connection that can withstand extreme fluctuations in temperatures and pressures. The serrated profile gasket commonly handles pressures from vacuum to Class 2500, and withstands temperatures from cryogenics to 2000° F. (1090° C.), depending on sealing material and metal.

Figure 4:
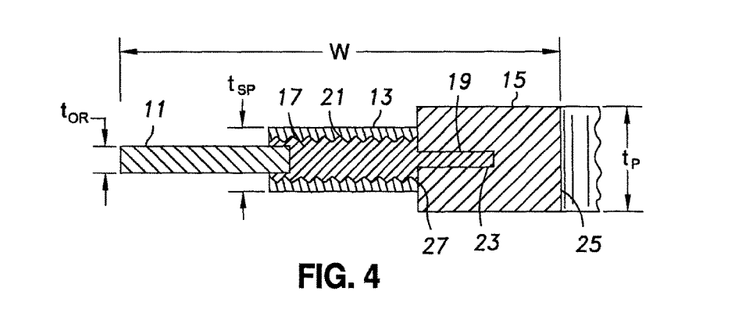
FIG. 4 is an enlarged sectional view of a portion of the gasket shown in FIG. 3.
Figure 5:
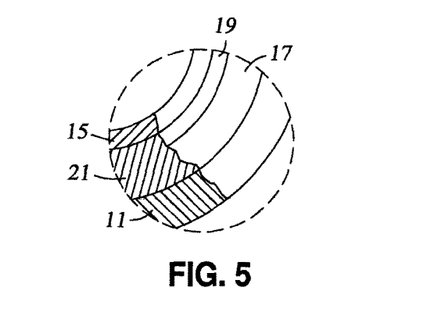
FIG. 5 is a cut away view of the gasket.

More detail regarding the construction of the gasket 10 is illustrated at FIGS. 4 and 5. As shown therein, the deformable barrier pillow 15 defines a pillow thickness, $t_p$, that is greater than the serrated profile sealing element 13 thickness, $t_{sp}$ or the outer guide ring 11 thickness, $t_{or}$. However, as explained in more detailed below, the pillow 15 is formed of a relatively soft, compressible material, such that the pillow material may be compressed to a thickness substantially equal to the thickness of the serrated profile sealing element 13, $t_{sp}$.

Graphite sealing facing 21 extends over/across the serrated core 17. Upon compression, the graphite facing 21 is compressed against and fills in the recesses defined by the core serrations. The flange, or inner attachment ring 19, is engaged to and extends from the serrated core 17. In the presently preferred embodiment, the serrated core 17 and flange 19 are formed from a single piece of metallic alloy, such as the family of alloys sold under the Monel trademark, but can be made of carbon steel or other metal compatible with the application.

Monel is a trademark of special metals corporation for a service of nickel alloys, primarily composed of nickel (up to 67%) and cooper, with some iron and other trace elements. Monel's good resistance against corrosion by acids and oxygen makes Monel a good material for use in highly corrosive environments. In the presently preferred embodiment Monel 400 is used in the construction of the serrated sealing element 17.

The inner expanded PTFE barrier pillow 15 envelops the flange 19 and abuts against the core 17 and graphite facing 21.

Upon compression of the gasket 10, the inner expanded PTFE barrier pillow 15 and the graphite facing 21 are compressed to an orientation that is substantially coplanar with the thickness of the serrated profile sealing element 13, and defines three sealing regions along the gasket 10.

As explained further below, the particular material used form the barrier pillow 15, and the particular thickness of the barrier 15 may be selected based upon the particular application, the bolt load applied to the gasket as the flanges are connected, the compression and sealing characteristics of the pillow material, and the construction and desired distribution of stress levels among the inner, intermediate and outer sealing zones of the gasket 10.

Figure 6:
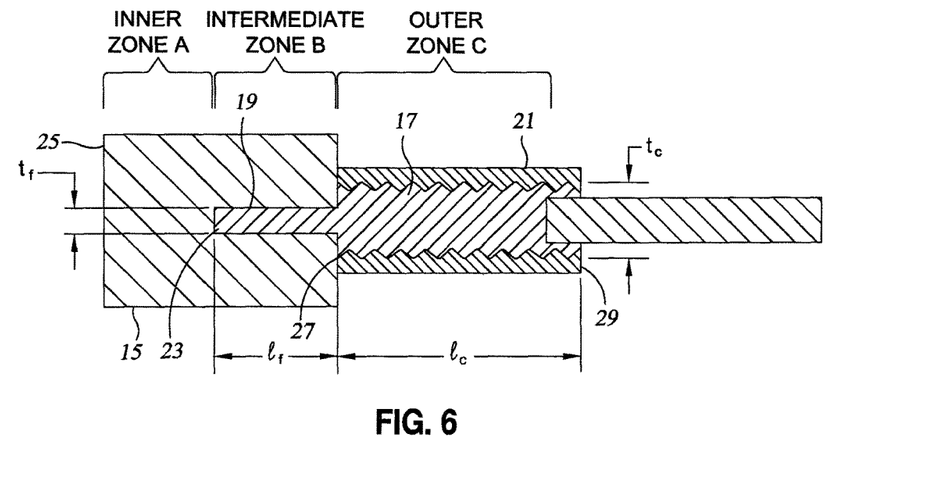
FIG. 6 is an enlarged sectional view of the gasket, showing different zones, each having different stress characteristics.

As shown in FIGS. 4 and 6, flange 19 extends from core 17 into the pillow 15. Flange 19 defines a flange thickness, $t_f$ and a flange length, $l_f$. As explained further below, the portion of pillow 15 through which flange 19 extends (intermediate Zone B) exhibits different characteristics in response to compression between the opposing pipe flanges 12, 14 (shown at FIG. 3). Upon compression, the stress levels on the inner portion of pillow 15, through which flange 19 extends (intermediate Zone B), are substantially greater than the stress levels on that portion of pillow 15 between flange 19 and the gasket inner surface 25 (inner Zone A). This is because the pillow material in intermediate Zone B experiences a higher percent compression than the pillow material in inner Zone A. The higher the compression, the higher the resulting stress level.

As shown in the embodiment illustrated at FIGS. 3 and 4, the fluid sealing gasket 10 defines a gasket width, of 1.1525 inches. The outer guide ring 11 extends approximately 30% of the gasket width. The serrated profile core 17 extends approximately 38% of the gasket width. The flange 19 extends approximately 32% of the gasket width. Consequently, in accordance with the present invention the main sealing element of the gasket, i.e. the core, extends over less than half of the gasket area. The size and location of the serrated core mitigates buckling problems and breaking associated with the conventional spiral-wound gaskets that contain Teflon inner rings, and enhances the ability of the gasket to compensate for relaxation that may occur.

In the same embodiment the exposed portion of the outer guide ring extends approximately 0.3437 inches. The unexposed portion of the outer guide ring extends approximately 0.0625 inches into the serrated profile core. The outer guide ring has a thickness that is also approximately 0.0625 inches.

The serrated profile core has a length, $l_c$, of approximately 0.4375 inches, and a thickness, $t_c$, of approximately 0.125 inches. The serrated profile core is preferably formed of a Monel metallic alloy. The serrated profile core flexible covering layer or facing has a thickness of approximately 0.020 inches and is preferably formed of APX2 Graphite, i.e., a flexible graphite material. The facing extends along the serrated profile core 17.

The length of the flange, or inner guide ring 19 extends approximately 16% of the gasket width, i.e. approximately 0.18565 inches. The flange is preferably formed to have a width, $w_f$, of approximately 0.03125 inches and a thickness $t_f$ of approximately 0.069 inches.

In the preferred embodiment, the flange 19 and the serrated profile core 17 may be formed as from a single, uninterrupted piece of Monel alloy material. FIG. 5 illustrates a construction wherein the serrated profile core and the flange are formed of a single piece of material. However in other constructions, the flange and the serrated profile core may be separately formed and connected.

In one preferred embodiment, the inner barrier pillow 15 preferably is formed to extend to approximately 32% of the width of the gasket, i.e., approximately 0.3713 inches. The barrier pillow has a thickness, $t_p$, of approximately 0.250 inches and defines a slot to receive the inner guide ring. The inner barrier pillow is formed preferably of expanded PTFE, which is machined and attached to the flange/serrated profile body, by a process in which the barrier pillow is first machined and then attached to the flange in a manner to assure that the barrier pillow resists separation or dislodging from the serrated sealing element inner attachment ring 19. More particularly, as described in relation to FIG. 4, a groove or slot is cut in the outer diameter of the PTFE barrier pillow ring. To do this, the barrier pillow is clamped between two machined metal tools that make up a clamping device that holds the barrier pillow by its inner diameter. The metal tool clamping device, with the barrier pillow clamped in it, is secured in a lathe, allowing a torque to be applied. While the metal clamping device and the barrier pillow are rotating about its center in the lathe, a sharp tool that cuts a groove into the barrier pillow's outer surface, shown in FIG. 4 as slot 23, that is approximately the same as the flange 19. After the groove has reached the desired depth, the sharp tool is backed out of the groove. The barrier pillow, with outer diameter groove, is then removed from the tooling. The flange 19 is then inserted within the slot formed in the barrier pillow.

FIG. 6 illustrates the separate sealing zones of a serrated profile sealing element in accordance with the present invention. As shown therein, inner Zone A and intermediate Zone B encompass different portions of the barrier pillow. Inner Zone A defines an inner portion of the barrier pillow extending from the inner surface 25 of the gasket to the inner surface 23 of the flange 19. Intermediate Zone B defines that portion of the barrier pillow through which flange 19 extends, i.e., from the inner surface of the flange 19 to the inner surface 27 of the serrate profile core 17. Outer Zone C encompasses the core portion extending from the core inner surface 27 to the core outer surface 29.

Described in more detail below, inner Zone A constitutes the softest portion of the serrated profile sealing element which, when compressed between the flanges 12, 14 (shown at FIG. 2) will seal against imperfections 16, 18 formed on the flanges 12, 14 respectively. The goal of this inner seal is simply to fill the area between the flanges and stop the process (caustic liquids) from being able to pass outwardly through the gasket to intermediate Zone B. The stress is low in this area, so it does not consume a high percentage of gasket stress that can be used more effectively to seal intermediate Zone B and outer Zone C. The stress load exhibited in inner Zone A is a function of characteristics of the material used to form inner Zone A, including the compressibility of the material, and the characteristic load associated with the compression of the inner Zone A material to a level substantially coplanar with the surface of the core 17.

Intermediate Zone B exhibits a higher stress load then inner Zone A, due to the presence of flange 19 such that the PTFE material in intermediate Zone B is more highly compressed than the PTFE material in inner Zone A. In addition to the stress load characteristics of the pillow material, the stress load characteristics of intermediate Zone B are also a function of the thickness of the flange 19. As such, the thickness of the inner flange may be regulated to set the desired gasket stress in this zone. The thicker the inner flange, the thinner the pillow material, causing greater compression of the pillow material resulting in higher gasket stress. In the presently preferred embodiment, the flange thickness is set at 0.069 inches, resulting in 3,620 psi gasket stress, which is above the 2,800 psi needed to establish a gas and liquid seal for the PTFE pillow material. As such, intermediate Zone B acts as an initial primary seal.

Ideally, the pillow material, pillow dimensions, and dimensions of the flange 19 are selected such that, upon compression of intermediate Zone B to a level substantially coplanar with the core 17, the stress load level will be at a level sufficient to provide an effective seal, precluding the flow of the caustic liquids and gasses to the primary seal, i.e. the core. The pillow material used in the presently preferred embodiment forms a liquid and gas seal at a stress level of approximately 2,800 psi.

The outer Zone C gasket stresses are generally even across all gasket sizes and pressure classes. In the presently preferred embodiment, the outer Zone C gasket stresses average approximately 21,000 psi, after the load on the pillow is deducted. Consequently, even if the pillow leaks, the serrated core would keep the flange connection tight.

Figure 7:
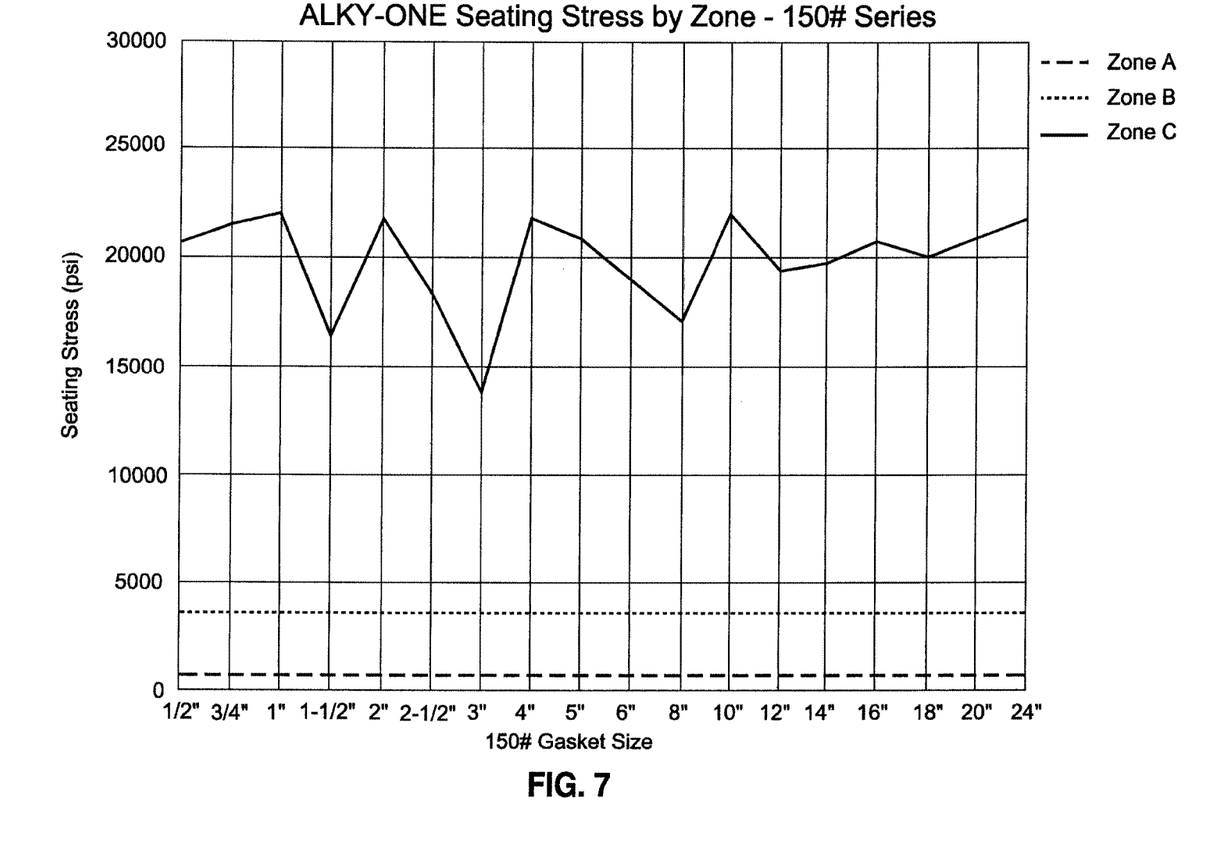
FIG. 7 is a graph depicting the load characteristics of each gasket zone, for a 150 class gasket.

FIG. 7 is a graph illustrating the gasket seating stress, by zone, for class 150 gaskets of different pipe sizes. As shown, the stress in inner Zone A is consistently 680 psi, the stress in intermediate Zone B is consistently 3,600 psi, and the stress in outer Zone C varies between 13,774 psi and 22,063 psi. The average outer Zone C seating stress for this class of gaskets is 19,922 psi.

Figure 8:
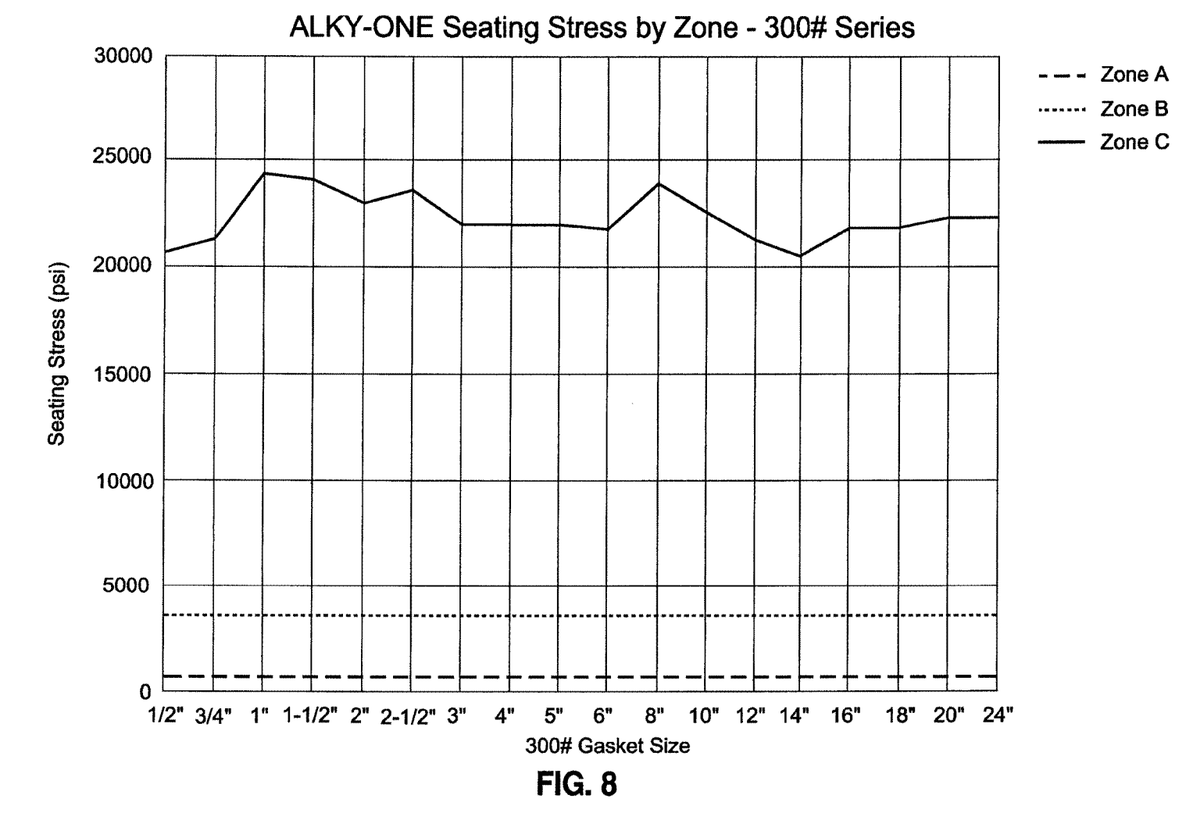
FIG. 8 is a graph depicting the load characteristics of each gasket zone, for a 300 class gasket.

FIG. 8 is a graph illustrating the gasket seating stress, by zone, for class 300 gaskets of different pipe sizes. As shown, the stress in inner Zone A is consistently 680 psi, the stress in intermediate Zone B is consistently 3,600 psi, and the stress in outer Zone C varies between 20,609 psi and 24,405 psi. The average outer Zone C seating stress for this class of gaskets is 22,371 psi.

Figure 9:
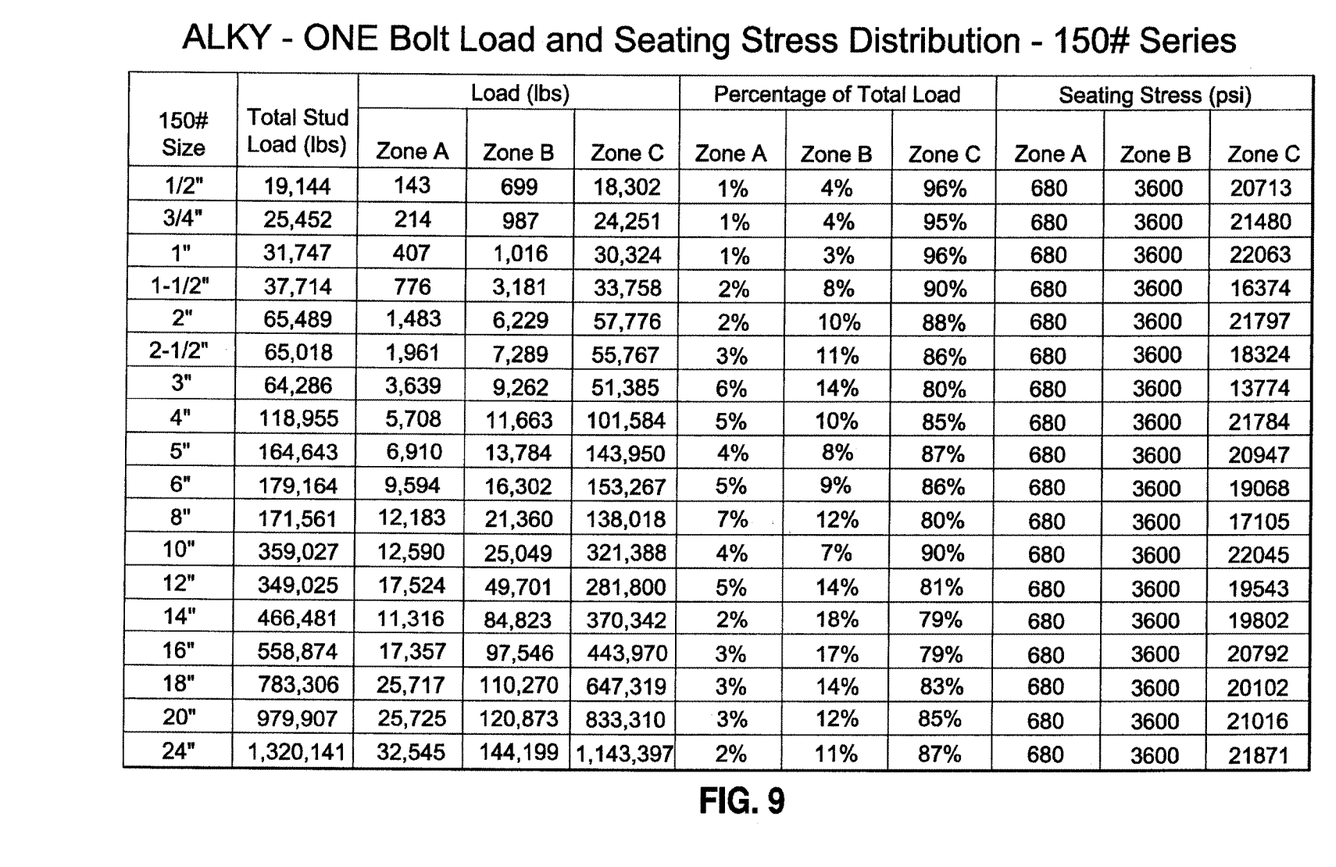
FIG. 9 is a chart listing the gasket stress and distribution of stress for the graphs of FIG. 7.
Figure 10:
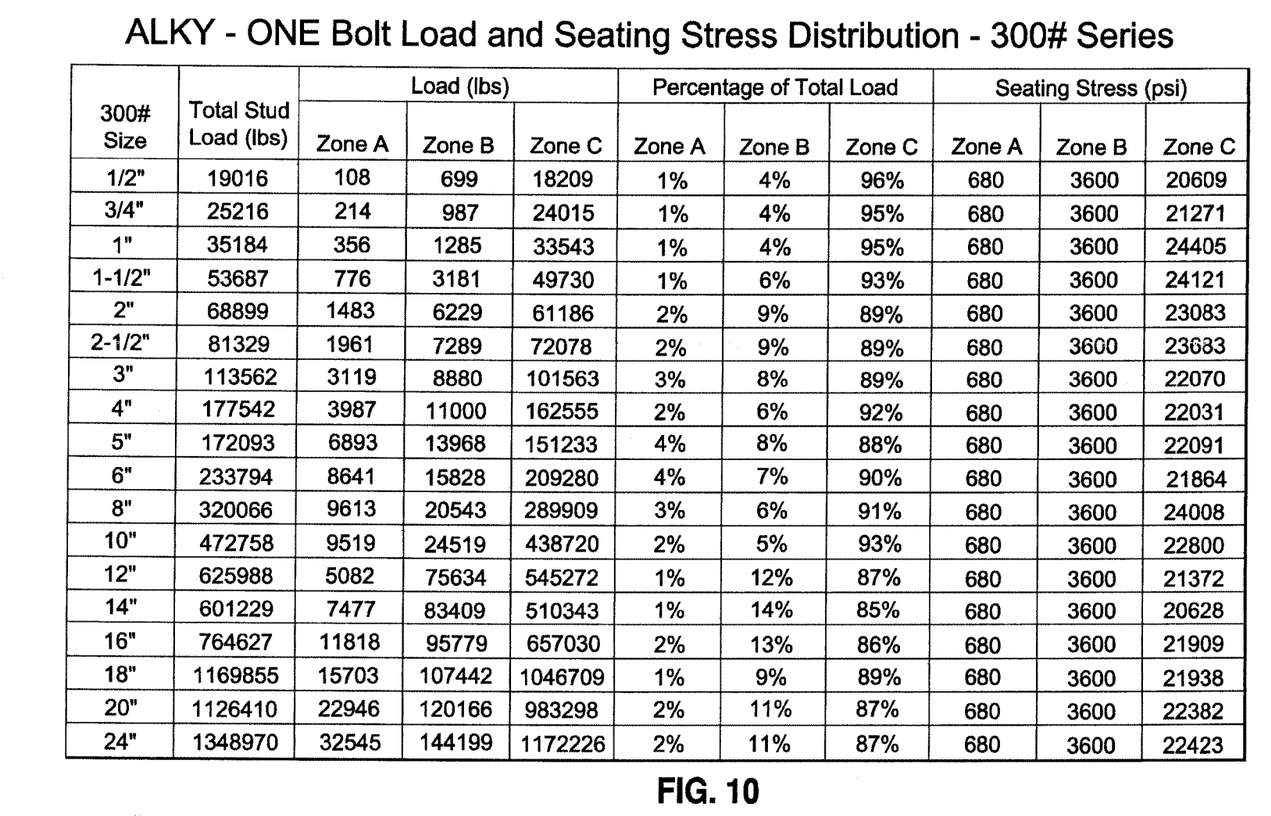
FIG. 10 is a chart listing the gasket stress characteristics of each gasket zone for the graph of FIG. 8.

FIGS. 9 and 10 are tables of data points used to prepare FIGS. 7 and 8, and also show the total stud stress applied to the gaskets, the amount of the stud stress delivered to each zone, and the percentage of the total stud stress on each zone. It is shown that only a small part of the stud load is required to generate the gasket stresses in inner Zone A and intermediate Zone B, while the largest fraction of stud load is delivered to the primary seal (outer Zone C), amounting to an average of 86% for class 150 gaskets (FIG. 9), and 90% for class 300 gaskets (FIG. 10).

FIG. 10 illustrates the compression characteristics of the material used to form the pillow in one presently preferred embodiment. As shown therein, a PTFE pillow, having an initial thickness of 0.250", exhibits a gasket stress of 680 psi when compressed 44%. This compression is sufficient to establish basic fluid sealability in inner Zone A.

Figure 11:
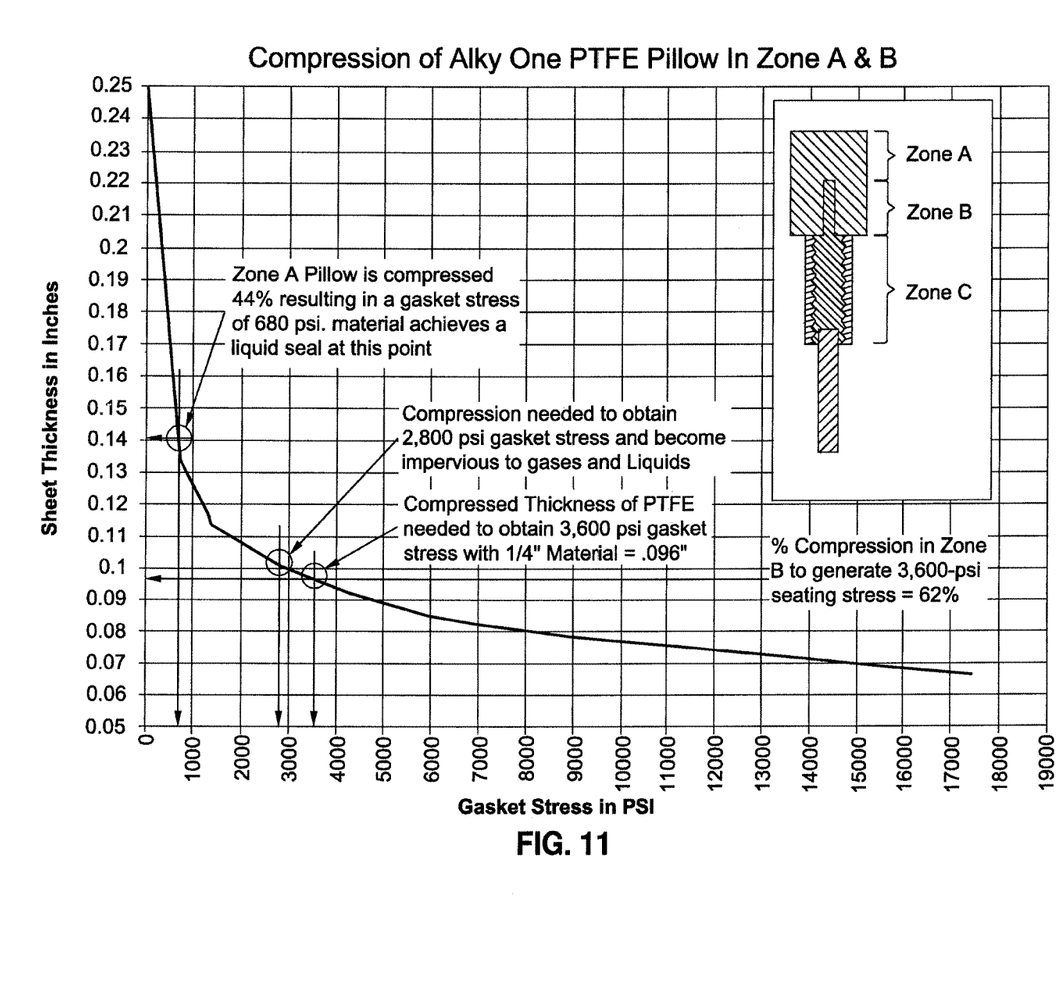
FIG. 11 is a graph depicting compression characteristics of the pillow material used in the gasket.

FIG. 11 further demonstrates the compression needed to obtain the desired gasket stress levels for PTFE material in intermediate Zone B. For example, a 62% compression is needed to obtain 3,600 psi gasket stress in intermediate Zone B, when the material is 0.096 inches. This level of compression is obtained in intermediate Zone B both through the method of grooving the outer diameter of the PTFE barrier pillow and by the selected thickness of flange 19, and ensures that intermediate Zone B has sufficient seating stress to comfortably exceed the stress required to seal the PTFE material against both liquids and gasses. Where higher stress levels are required to form a seal for the selected PTFE material, the thickness of the flange 19 may be increased (or the thickness of the pillow material may be altered) to obtain higher intermediate Zone B stress levels. Ideally the architecture of the serrated profile sealing element components will be such that inner Zone A exhibits only a relatively low stress needed to prevent liquid intrusion, intermediate Zone B exhibits only a stress level sufficient to reliably form a seal that is impervious to liquids and gasses, and the highest stress levels occur in outer Zone C, where the primary sealing resides.

Moreover, the distribution of the available stud stress is also dependent upon the area of each Zone that is being stressed. For example, the shortening of flange 19 (while maintain the same length of pillow material) will both increase the load required to compress inner Zone A and decrease the load required to compress intermediate Zone B. Consequently, by appropriate engineering of the components of gasket 10, as described herein, the appropriate loads can be further distributed between Zones A, B and C. Ideally the distribution of the load and the overall load itself will remain relatively constant.

Figure 12:
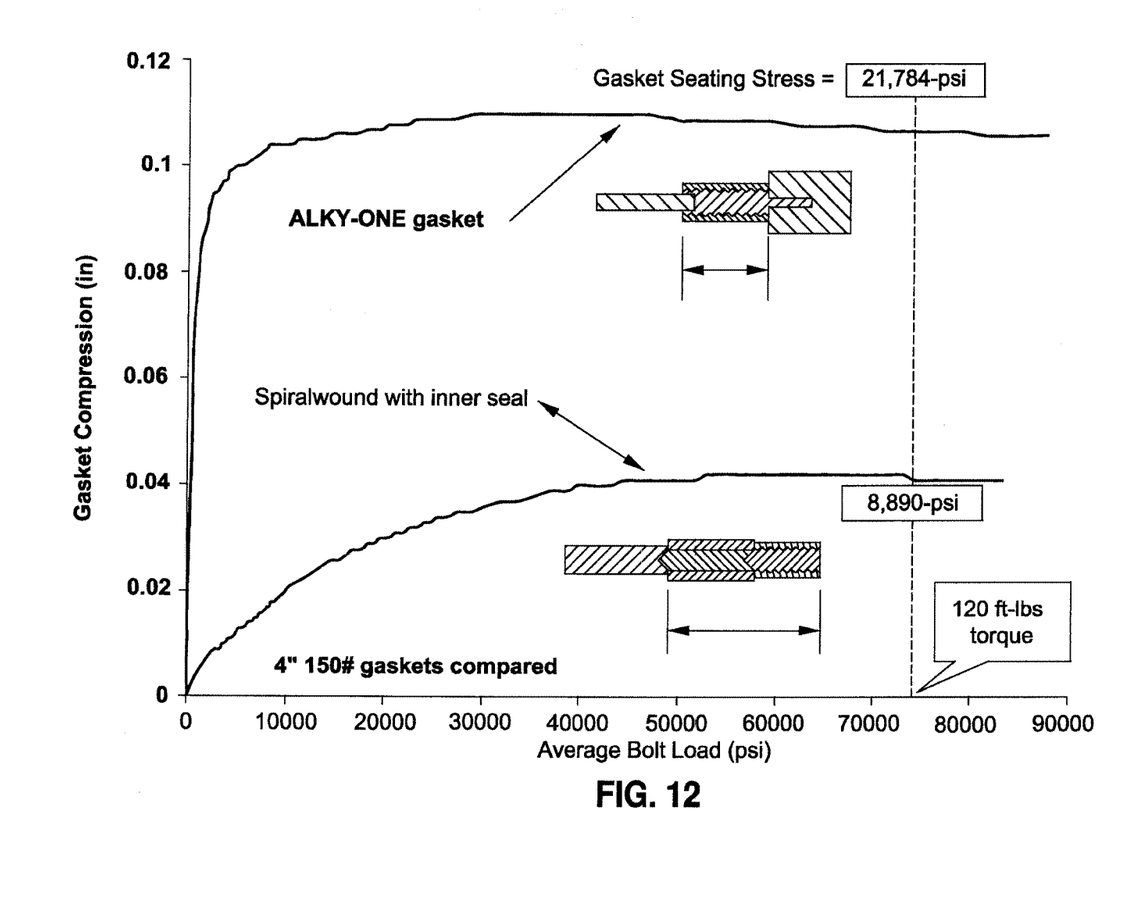
FIG. 12 is a graph depicting the compression characteristics of different gaskets.

FIG. 12 provides a comparison of the compression characteristics of ALKY-ONE gasket, with the compression characteristics of a spiral wound gasket having a serrated core inner ring. As shown in FIG. 12, over a range of bolt loads, the ALKY-ONE gasket is more compressible, comes to full compression with half the bolt load, and generates much higher sealing stresses in its primary seal.

Table 1 (below) shows the calculation for determining the percentage compression of the PTFE pillow material when the load is applied to the gasket. Once the percent compression is computed, the stress load applied the zone may be determined by referencing the graph depicting the compression characteristics of the pillow material used, as shown at FIG. 10.

TABLE 1

| Row | | Zone A | Zone 8 | |
|---|---|---|---|---|
| 1 | Original PTFE Thickness (in) | 0.250 | 0.250 | |
| 2 | Cut in PTFE (in) | | 0.063 | |
| 3 | Net PTFE Thickness (in) | 0.250 | 0.187 | [Row 1 − Row 2] |
| 4 | Ultimate Compressed Thickness | 0.140 | 0.140 | |
| 5 | Thickness of ID Flange (in) | | 0.069 | |
| 6 | Space into which PTFE is Compressed | 0.140 | 0.071 | [Row 4 − Row 5] |
| 7 | Compression of PTFE (in) | 0.110 | 0.116 | [Row 1 − Row 6] |
| 8 | % Compression of PTFE | 44.0% | 62.0% | [1 − (Row 6/Row 3)] |
| 9 | Gasket Stress @ Above % (psi) | 680 | 3,600 | |

As shown at Table 1, in one presently preferred embodiment the thickness of the barrier pillow, $t_p$, was selected to be 0.25 inches. In inner Zone A this material is compressed down to a thickness of 0.140 inches, a level substantially coplanar with the serrated core and core facing. In intermediate Zone B, the cut in the pillow reduces the effective thickness of the PTFE pillow to 0.187 inches, and the added presence of the flange 19 requires that the pillow be compressed into a gap of only 0.071 inches. The compression of the PTFE in Zones A and B are then determined and the percentage of compression of the PTFE may be calculated. At that point, the stress level associated with the percentage compression can be derived from the PTFE pillow compression characteristics, such as shown at FIG. 10. In the presently preferred embodiment, the resulting gasket stress level in inner Zone A is 680 psi, whereas the gasket stress level in intermediate Zone B is 3,600 psi. As noted above, for the particular PTFE material selected, the gasket stress level in intermediate Zone B is sufficient to form an effective seal, precluding the flow of acids to the primary seal (i.e., the core). As such, the gasket is effective to provide dual, independent sealing zones when constructed to the referenced dimensions. In the event that the resulting stress levels in the gasket, e.g. at intermediate Zone B, were determined to be insufficient to form an effective seal for the selected pillow material, the gasket construction could be modified to enhance the stress levels in different portions of the gasket. For example, the thickness of the flange could be increased, the thickness of the pillow material could be decreased, or different pillow material could be selected.

As one of ordinary skill in the art would recognize, various enhancements, and substitutions may be made in relation to the materials, and dimensions used for a particular implementation, without departing from the broader scope and spirit of the present invention. As such, those modifications, enhancements and substitutions are intended to be encompassed within the scope of the present invention.

What is claimed is:

1. A fluid sealing gasket for sealing opposing flange surfaces of a pipe having corrosive fluid flowing therethrough, the gasket comprising:
   a gasket profile including a serrated profile core having a core thickness;
   a flange extending radially inward from an inner surface of the serrated profile core and having a flange thickness that is less than the core thickness; and a deformable pillow formed about the flange and extending radially inward from the inner surface of the serrated profile core beyond the flange to define a gasket inner surface,
wherein the gasket has an outer, high stress, fire resistant sealing zone about the serrated profile core, an intermediate stress gas/liquid sealing zone between the inner surface of the serrated profile core and a flange inner surface, and an inner, low stress liquid sealing zone between the flange inner surface and the gasket inner surface,
wherein a pillow thickness of the deformable pillow is greater than a thickness of the outer, high stress, fire resistant sealing zone of the gasket,
wherein a pillow material and the pillow thickness comprise a desired minimum inner zone stress level when the deformable pillow material in the inner zone is compressed to a compressed thickness of no less than the core thickness, and
wherein a gasket seating stress for the outer, high stress, fire resistant sealing zone is greater than a gasket seating stress for the intermediate stress gas/liquid sealing zone.

2. The fluid sealing gasket according to claim 1, wherein the serrated profile core is formed from a metallic alloy or carbon steel.

3. The fluid sealing gasket according to claim 2, wherein the metallic alloy is a Monel alloy.

4. The fluid sealing gasket according to claim 1, wherein the serrated profile core is covered by a flexible covering material.

5. The fluid sealing gasket according to claim 4, wherein the flexible covering material is a flexible graphite material.

6. The fluid sealing gasket according to claim 1, wherein the core thickness of the serrated profile core is about 0.125 inches thick.

7. The fluid sealing gasket according to claim 1, wherein the pillow material comprises expanded PTFE.

8. The fluid sealing gasket according to claim 7, wherein the pillow thickness is about 0.25 inches.

9. The fluid sealing gasket according to claim 1, further comprising an outer guide ring having a guide ring thickness which is less than the core thickness.

10. The fluid sealing gasket according to claim 1, wherein a gasket seating stress for the intermediate stress gas/liquid sealing zone is greater than a gasket seating stress for the inner, low stress liquid sealing zone.

11. A fluid sealing gasket for sealing opposing flange surfaces of a pipe having corrosive fluid flowing therethrough, the gasket comprising:
a serrated profile core having a core thickness;
a flexible covering material covering the serrated profile core;
a flange extending radially inward from an inner surface of the serrated profile core, the flange having a flange thickness that is less than the core thickness;
a deformable pillow formed about the flange and extending radially inward from the inner surface of the serrated profile core beyond the flange to define a gasket inner surface; and
an outer guide ring extending radially outward from the serrated profile core and having a guide ring thickness which is less than the core thickness,
wherein the gasket comprises at least three gasket sealing zones each comprising a different gasket seating stress, the at least three gasket sealing zones including:
an outer, high stress, fire resistant sealing zone about the serrated profile core;
an intermediate stress gas/liquid sealing zone between the inner surface of the serrated profile core and a flange inner surface; and
an inner, low stress liquid sealing zone between the flange inner surface and the gasket inner surface,
wherein a gasket seating stress for the outer, high stress, fire resistant sealing zone is greater than a gasket seating stress for the intermediate stress gas/liquid sealing zone which is greater than a gasket seating stress for the inner, low stress liquid sealing zone.

12. The fluid sealing gasket according to claim 11, wherein the deformable pillow defines a pillow thickness and is composed of a pillow material which is compressible to a compressed thickness of no less than the core thickness.

13. The fluid sealing gasket of claim 12, wherein the pillow thickness is greater than a thickness of the core covered by the flexible covering material.

14. A fluid sealing gasket for sealing opposing flange surfaces of a pipe having corrosive fluid flowing therethrough, the gasket comprising:
a serrated profile core having a core thickness;
a flexible covering material covering the serrated profile core;
a flange extending radially inward from an inner surface of the serrated profile core, the flange having a flange thickness that is less than the core thickness;
a deformable pillow formed about the flange and extending radially inward from the inner surface of the serrated profile core beyond the flange to define a gasket inner surface, wherein a pillow thickness is greater than a thickness of the serrated profile core covered by the flexible covering material; and
an outer guide ring extending radially outward from the serrated profile core and having a guide ring thickness that is less than the core thickness,
wherein the deformable pillow is composed of a pillow material that is compressible to a compressed thickness of no less than the core thickness, and
wherein the gasket comprises at least three gasket sealing zones each comprising a different gasket seating stress, the at least three gasket sealing zones including:
an outer, high stress, fire resistant sealing zone about the serrated profile core;
an intermediate stress gas/liquid sealing zone between the inner surface of the serrated profile core and a flange inner surface; and
an inner, low stress liquid sealing zone between the flange inner surface and the gasket inner surface.

15. The fluid sealing gasket according to claim 14, wherein the flexible covering material comprises a flexible graphite material.

16. The fluid sealing gasket according to claim 14, wherein the pillow material comprises expanded PTFE.

* * * * *